United States Patent [19]

Thomas et al.

[11] 4,355,936
[45] Oct. 26, 1982

[54] EGG TRANSFER APPARATUS

[75] Inventors: Leslie P. Thomas, Canton; George N. Bliss, Franklin, both of Mich.

[73] Assignee: Diamond International Corporation, New York, N.Y.

[21] Appl. No.: 182,134

[22] Filed: Aug. 28, 1980

[51] Int. Cl.³ .................................................. B65G 59/04
[52] U.S. Cl. ........................................ 414/118; 294/65; 294/87 A; 414/120; 414/121
[58] Field of Search ................... 414/30, 34, 118, 120, 414/121, 416, 733, 735, 736, 737, 67; 294/2, 64 R, 65, 87 A; 198/689; 271/9, 91, 107

[56] References Cited

U.S. PATENT DOCUMENTS

| | | | |
|---|---|---|---|
| 3,102,751 | 9/1963 | Noble et al. | 294/65 |
| 3,327,450 | 6/1967 | Carter . | |
| 3,717,336 | 2/1973 | Short et al. | 271/9 |
| 3,776,393 | 12/1973 | Bargstedt | 414/121 |
| 3,792,784 | 2/1974 | Mosterd | 414/30 X |
| 3,805,943 | 4/1974 | Warren | 414/416 X |
| 3,939,993 | 2/1976 | Lingl | 414/34 |
| 4,045,073 | 8/1977 | Mosterd | 294/87 A |
| 4,079,845 | 3/1978 | Warren | 414/121 |
| 4,164,296 | 8/1979 | Trees | 414/416 |
| 4,221,517 | 9/1980 | Guzzetta et al. | 414/120 X |

FOREIGN PATENT DOCUMENTS

| | | |
|---|---|---|
| 1039795 | 8/1966 | United Kingdom . |
| 1229785 | 4/1971 | United Kingdom ................ 414/120 |
| 1303565 | 1/1973 | United Kingdom . |
| 1536487 | 12/1978 | United Kingdom . |

Primary Examiner—Leslie J. Paperner
Attorney, Agent, or Firm—Kenyon & Kenyon

[57] ABSTRACT

An apparatus for transferring individual trays of eggs from the top of adjacently spaced stacks onto a conveyor member. A lifting head is provided for each stack of egg trays and includes thereon vacuum cups which are engagable with each of the individual eggs in the uppermost tray. A vacuum actuated gripper is further provided with each lifting head assembly for engaging and lifting the uppermost tray away from the remainder of the stack. Each lifting head assembly is associated with a rotatable drive to effect rotation during transfer while also moving adjacently spaced lifting head assemblies with respect to one another in order to avoid contact during simultaneous rotation of adjacent lifting head assemblies. Relative movement between each head assembly and the respective support platform is also provided to accommodate variations in height between adjacent stacks to insure proper engagement with the uppermost tray to be transferred.

16 Claims, 5 Drawing Figures

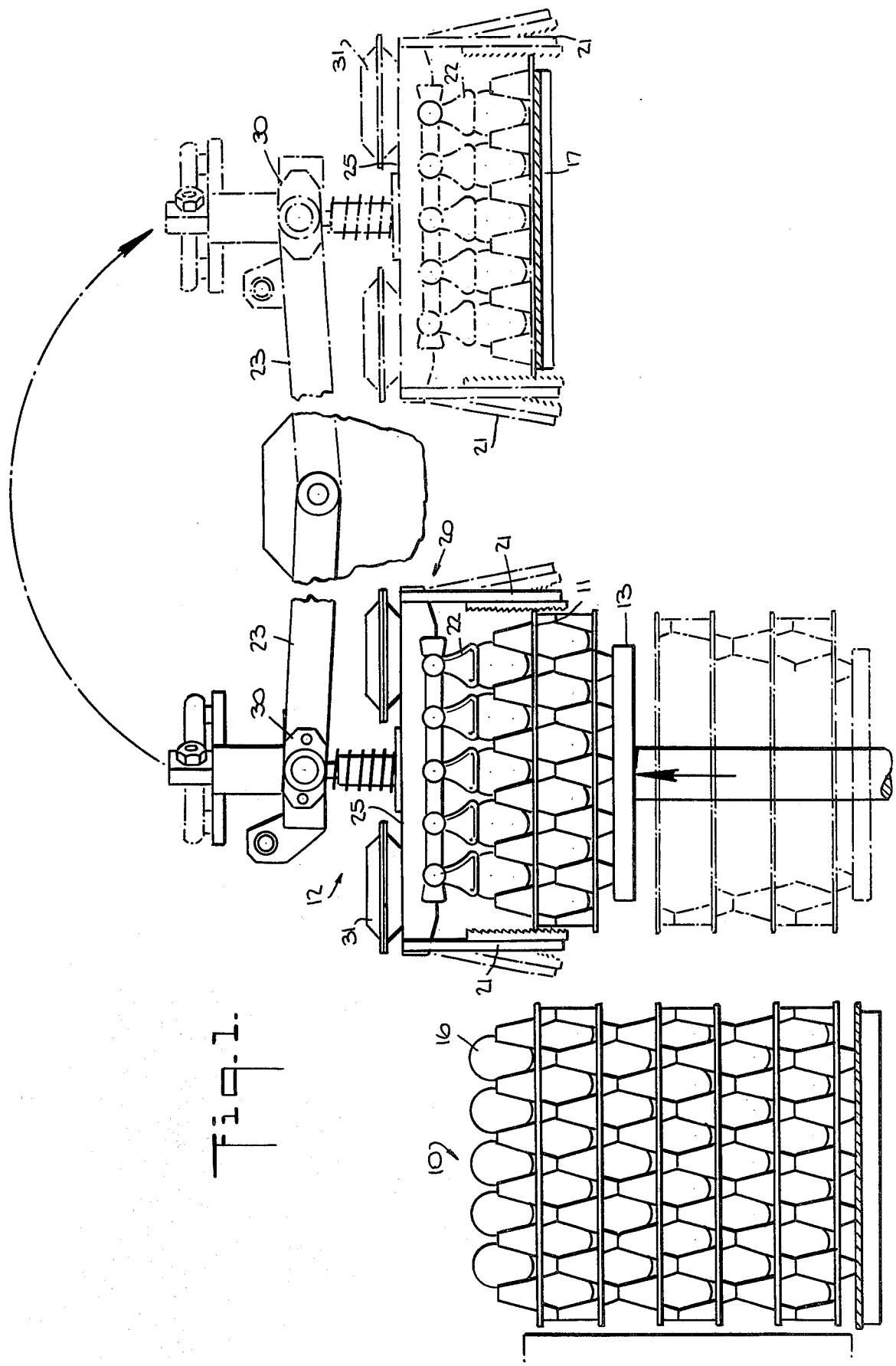

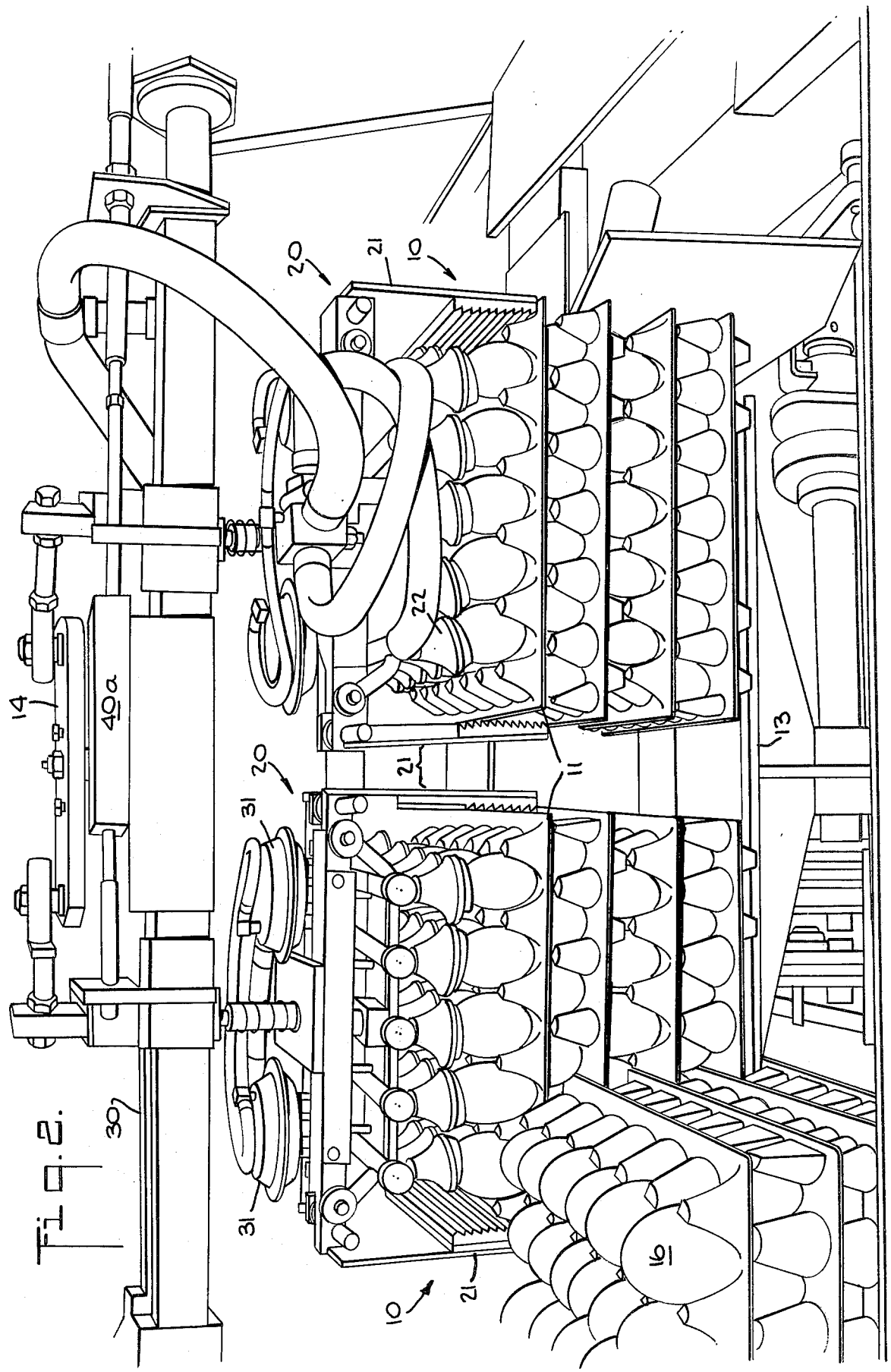

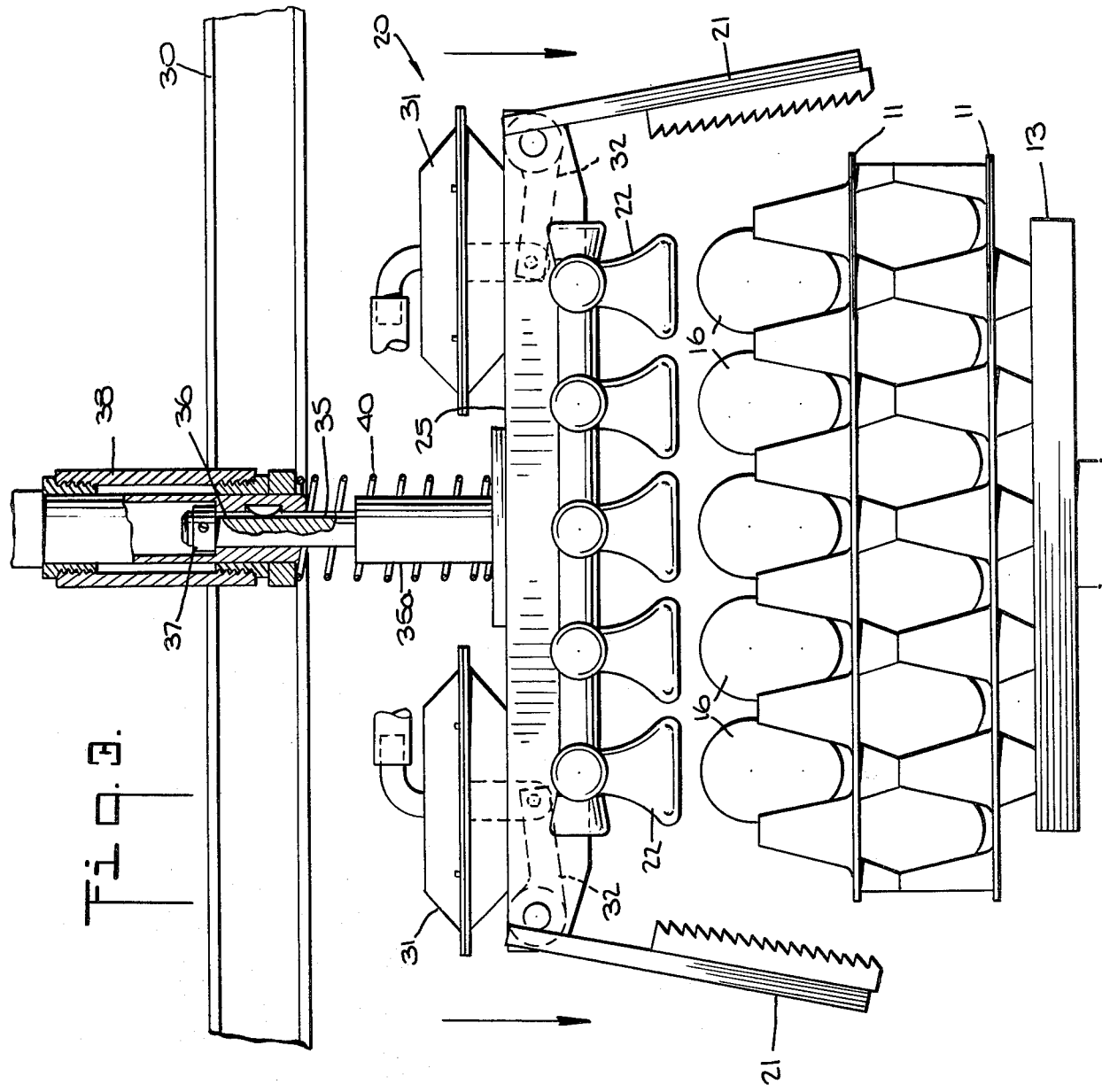

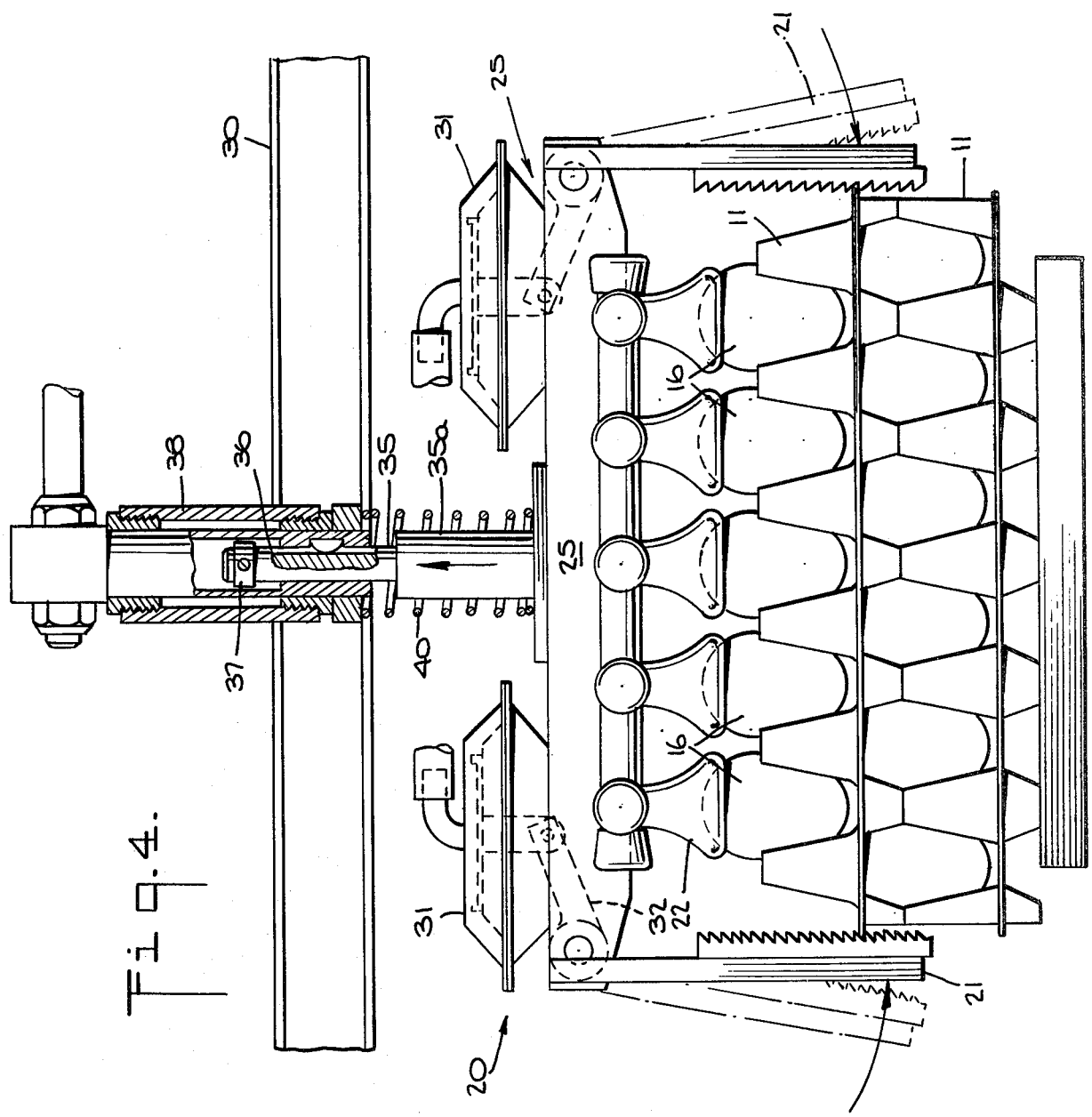

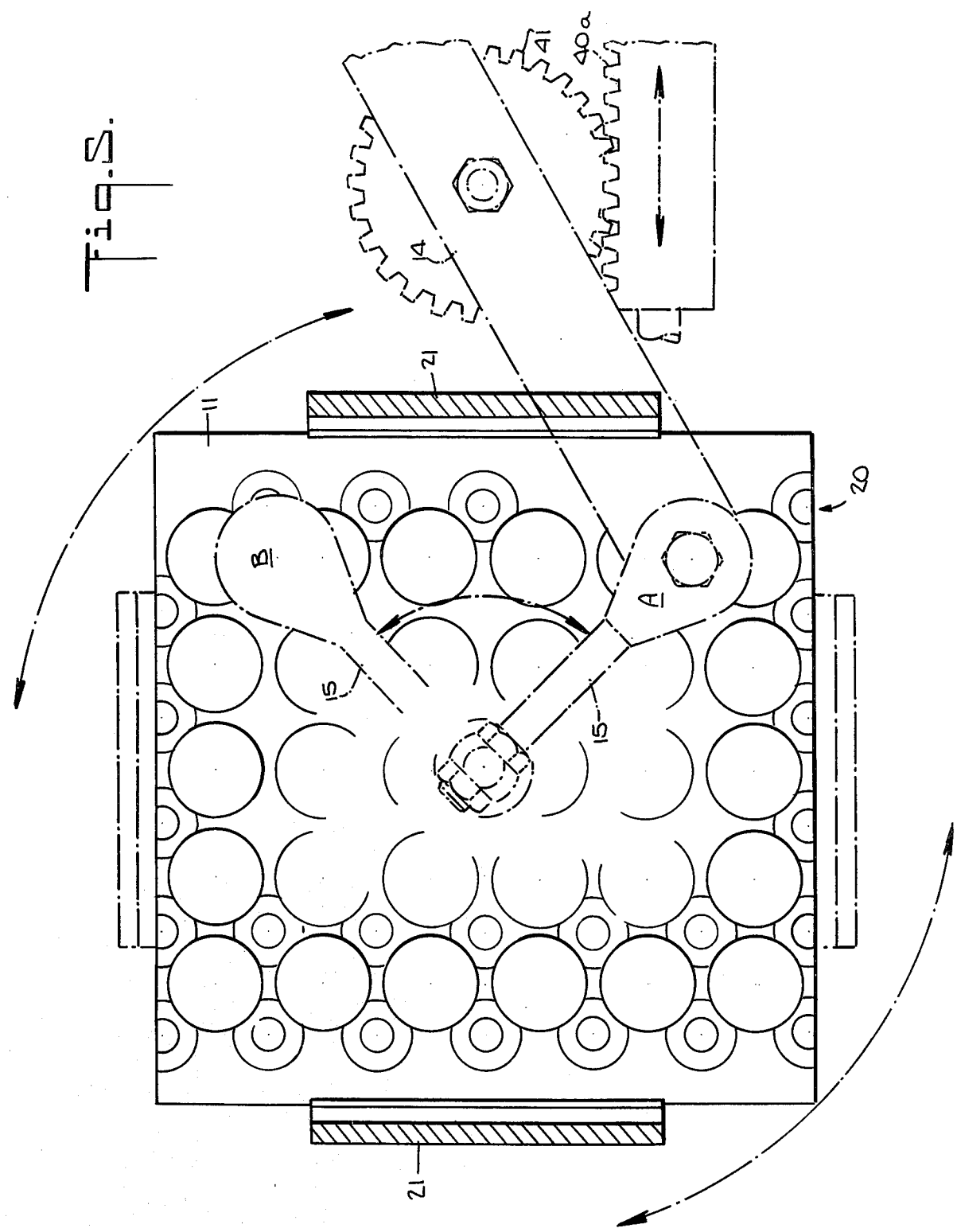

EGG TRANSFER APPARATUS

BACKGROUND OF THE INVENTION

In the processing and packaging of eggs, the eggs are generally received at the facility in boxes containing stacks of flat egg trays. Each egg tray generally contains thirty eggs, the trays being formed in 6×5 rows. The trays are stacked upon one another with each tray being rotated 90° with respect to the immediately adjacent tray.

After the stack of flat egg trays is removed from the shipping box the entire stack is conveyed to a pick-up station at which individual flat trays of eggs are transferred to a conveyor. While carried by the conveyor, the eggs are removed from the trays and transferred to spools or other conveyor means which ultimately carry the eggs to an egg washer. The empty flat tray is then automatically stacked and ready for further usage.

To accomplish the most efficient transfer of the tray of eggs onto the conveyor, simultaneous transfer of a plurality of trays is highly desirable and results in increased production rates. In this manner of operation, at least two stacks of flat egg containing trays are provided to a pick-up station at which the uppermost tray from each stack is lifted and transferred onto the conveyor. Because of variations in the size of eggs contained on individual trays, it has been found that it is not always possible to properly engage adjacently spaced stacks of trays. Thus, when the variation in stack height is sufficiently great, the pick-up head fails to engage and properly lift one of the uppermost trays all of which may result in machine stoppage or egg breakage.

The stacked trays which are rotated 90° with respect to one another further requires the alternate trays of eggs or the tray engaging means be rotated for each successive transfer. When adjacently spaced stacks of trays are provided in close proximity to one another, such rotational movement is precluded or complex mechanisms must be provided to effect the necessary rotation in a sequential manner.

By the means disclosed herein, variations in stack height of adjacently spaced trays of eggs are readily accommodated. Further, the disclosed means provides the necessary rotation to accommodate the different orientation of adjacently stacked egg trays while effecting simultaneous transfer thereof. The means disclosed herein thus insures full engagement with the uppermost tray of eggs positioned in stacks adjacent to one another even when the height of the respective stacks differs and effects simultaneous transfer while imparting the necessary rotational movement to the egg tray during transfer.

SUMMARY OF THE INVENTION

Briefly stated, this invention is directed to an apparatus for transferring egg trays from multiple stacks of trays disposed at a pick-up station. A carrier member is provided on a transfer arm which is adapted to be pivoted from one station to another. The carrier member is provided with a plurality of lifting head assemblies which correspond in number to the number of adjacently spaced stacks of eggs. The lifting head assembly includes vacuum cups for engaging the individual eggs as well as vacuum actuated gripper members to engage the uppermost tray in each of the respective stacks. The lifting head assembly is permitted to float with respect to the carrier means such that each of the eggs in the uppermost trays of adjacent stacks is fully engaged and lifted by the respective head assembly.

In this respect, each lifting head assembly is mounted to the carrier member by means of a shaft which is movable with respect thereto. The lifting head mounting shaft is provided with a stop member so that a limited movement of the head assembly is provided. More specifically, a collar is provided at the uppermost portion of the lifting head mounting shaft which is engagable with the upper portion of the carrier means so as to limit the downward movement of the entire head assembly. At the lower end of the lifting head mounting shaft is a further stop member which limits the upward movement of the head assembly with respect to the carrier means. Sufficient spacing is provided between stop members to enable relative movement between the lifting head assembly and the carrier means so as to accommodate variations in stack height between adjacent stacks of eggs.

Each lifting head assembly is coupled to one another by means of a rotatably driven arm which has the ends thereof pivotally mounted to a linkage member. The other end of the linkage member is connected to the respective lifting head assembly. In this manner, the rotatable connecting arm which is driven via a rack and pinion drive, imparts a 90° rotational movement to each of the lifting head assemblies during the transfer thereof from one station to another while moving each head assembly with respect to the other to avoid contact during the simultaneous rotation thereof.

In a further embodiment, a resilient means in the form of a compression spring may be disposed on the lifting head mounting shaft between the lifting head and carrier means. This spring urges the lifting head downward into engagement with the uppermost tray of eggs.

Accordingly, it is an object of this invention to provide a means for transferring eggs from adjacently spaced stacks of egg trays from one station to another.

It is another object of this invention to provide an apparatus for transferring eggs from adjacently spaced stacks of egg trays and which is adapted to accommodate variations in height between adjacently spaced stacks of egg trays.

It is still another object of this invention to provide a means for transferring eggs from a stack of egg trays and imparting rotational movement thereto during the transfer to accommodate the different orientation of adjacently spaced egg trays.

It is a further object of this invention to provide a means for transferring egg trays in adjacently spaced stacks of egg trays from one station to another while imparting simultaneous rotational movement to each egg tray during the transfer as well as lateral movement between the adjacently spaced egg trays being transferred so as to avoid contact during the rotational movement thereof.

It is a still further object of this invention to provide an egg transfer apparatus in which the egg engaging means is movable with respect to the transfer mechanism.

These and other objects of the invention will become more apparent from the following description of the preferred embodiment when considered in conjunction with the accompanying drawings and appended claims.

BRIEF DESCRIPTION OF THE DRAWINGS

FIG. 1 is a side elevational view of the egg transfer apparatus in this invention;

FIG. 2 is a front perspective view illustrating the adjacently spaced egg engaging lifting heads of the egg transfer apparatus;

FIG. 3 is an enlarged front elevation view of one of the egg lifting assemblies disposed slightly above the uppermost tray of one of the multiple stacks of egg trays;

FIG. 4 is an enlarged front elevation view of one of the egg lifting assemblies engaging the uppermost stack of eggs; and FIG. 5 is a plan view of one of the adjacently spaced egg lifting head assemblies of this invention.

DESCRIPTION OF THE PREFERRED EMBODIMENT

With reference to the drawings and particularly FIG. 1, the egg transfer apparatus of this invention is illustrated for use in conjunction with 6×5 egg tray flats holding thirty eggs each. The stack of trays generally denoted as 10 includes individual tray members 11, and is illustrated with six vertically stacked individual trays 11. Each respective tray member 11 in the stack 10 is rotated 90° with respect to the immediately adjacent tray. The stack of trays 10 is transported by the conveyor 11a to pick-up station 12 where it is positioned on a support platform 13. Support platform 13 is adapted to index the trays upwardly so as to position the uppermost tray 11 in the transfer position.

During the initial processing of the eggs, uppermost tray 11 including eggs 16 is lifted from the pick-up station 12 and pivoted through a 180° arc onto conveyor 17. At pick-up station 12, a lifting head assembly 20 is brought into engagement with the uppermost tray of eggs 11 by a pair of gripper arms 21 engaging opposite edges of the tray. Vacuum cups 22 are at the same time brought into engagement with each of the respective eggs and collapsed to engage the egg while gripper arms 21 are brought into the tray engaging position. Once the uppermost tray has been so engaged, transfer arm 23 is pivoted from pick-up station 12 approximately 180° to a position directly above conveyor 17. During transfer from pick-up station 12 to conveyor 17, lifting head assembly 20 may be rotated 90° as described below in order to accommodate the different orientation of the egg trays in each respective stack. At conveyor 17, the tray is lowered with the grippers 21 and vacuum cups 22 releasing and depositing the egg containing tray onto the conveyor.

At the pick-up station, multiple stacks of eggs 10 are provided and disposed adjacent to one another on platform 13. For each stack of eggs 10, a separate lifting head assembly 20 is provided. Each lifting head assembly 20 is mounted to a common carrier member 30 which in turn is moved from the pick-up station 12 to conveyor 17 by means of transfer arm 23. Reference is particularly made to FIGS. 3 and 4 to describe the structure and operation of each lifting assembly 20. The vacuum cups 22 and grippers 21 are mounted to a support bar 25 which on the uppermost portion thereof includes a pair of vacuum actuated solenoid valves 31. Solenoid valves 31 are connected by means of appropriate flexible hosing to a vacuum supply. Gripper 21 is actuated via the linkage 32 from an open position (FIG. 3) into a closed tray engaging position (FIG. 4). Similarly, vacuum cups 22 are lowered into engagement with the top portion of the eggs in the uppermost tray 11 (FIG. 4).

Support bar 25 is affixed to a stepped coupling shaft 35 which extends upwardly therefrom. The upper portion of coupling shaft 35 extends through an aperture 36 in carrier member 30. At the upper portion of coupling shaft 35 is fastened a collar 37 which acts as a stop thereby preventing downward movement of the lifting head assembly 20. As illustrated, stepped shaft 35 is provided with a larger diameter at its lower portion 35a. In this manner, shaft 35 limits the upward movement of the lifting head assembly 20 with respect to carrier member 30.

Outer sleeve 38 is connected to linkage 15 by which rotational movement of lifting head assembly 20 is achieved to facilitate alignment of the vacuum cups 22 with the respective tray members 11 in a manner described in detail below. A spring member 40 is disposed on stepped shaft 35 between the lifting head assembly 20 and carrier member 30. The stepped shaft 35 is of a length sufficient to allow relative movement between the lifting head assembly 20 and carrier member 30. This operation is illustrated in FIGS. 3 and 4. The lifting head assembly 20 as illustrated in FIG. 3 is about to be brought into engagement with the uppermost tray of eggs 11. As the carrier member 30 is further lowered with the cups 22 engaging the top of the eggs, the lift head assembly is permitted to float and seek the proper height coincident with that of the eggs in the uppermost tray 11. Once the vacuum cups 22 are engaging the eggs in the upper tray 11 as shown in FIG. 4, further lowering of carrier member 30 causes the lifting head assembly 20 to be moved or floated upward with respect to carrier member 30. Thus, collar 37 is lifted out of engagement with the carrier member 30 and the lifting head assembly 20 is supported on the eggs with the grippers 21 engaging the edges of the tray. Movement of the lifting head assembly 20 with respect to carrier member 30 is limited by compression spring 40 and the lower portion of shaft 35. As the vacuum is applied and the uppermost tray is firmly engaged, carrier member 30 is rotated upwardly with collar 37 engaging carrier member 30 thus lifting the uppermost tray away from the remainder of stack 10.

Since each lifting head assembly is permitted independent relative movement with respect to the carrier member 30, variations in height between adjacently spaced stacks 10 are accommodated. Spring member 40 may be utilized to further urge the lifting head assembly 20 into engagement with the uppermost tray of eggs. In certain instances, spring member 40 is not required and the weight of the lifting head assembly may be sufficient to provide suitable engagement of the vacuum cups 22 with the upper tray of eggs.

Each lifting head assembly 20 is as mentioned rotatable to accommodate the different orientation of individual trays of eggs 11 which are upwardly indexed by support platform 13. With particular reference to FIGS. 2 and 5, a rotatable arm 14 is provided and has each end thereof coupled to one of the adjacently spaced lifting head assemblies 20. More specifically, linkage member 15 is pivotally connected to rotatable arm 14 while the other end thereof is fixed to lifting head assembly 20. Rotatable arm 14 is driven by means of the rack 40a which as it traverses in the direction of the arrow (FIG. 5), drives pinion gear 41 which in turn rotates arm 14. Rotation of arm 14 causes the lifting head assembly 20 to rotate 90° between positions A and B of FIG. 5. Rotation of arm 14 at the same time causes each lifting head assembly 20 to move laterally away from one another. This spreading apart of the respective lifting head assemblies 20 simultaneously with the 90° rotational movement thus avoids any contact or collision between the respective units. In this manner, each stack of egg trays 10 is positioned in close proximity with respect to the adjacent stack and is permitted to be rotated during transfer from pick-up station 12 to conveyor 17 without any contact.

The operational sequence of the egg transfer is such as to coincide with the orientation of the 6×5 egg trays. More specifically, each lifting head assembly 20 is oriented with respect to the uppermost tray of eggs in stack 10. With the eggs and tray engaged, lifting head assembly 20 is pivoted 180° to conveyor 17 without any associated rotational movement. On the return cycle, i.e. from conveyor 17 to pick-up station 12, each lifting head assembly 20 is rotated 90° (i.e. counterclockwise from position A to B of FIG. 5) in the manner described with the adjacent assemblies 20 being moved laterally with respect to one another thus avoiding any contact with one another during the rotational movement. Lifting head assembly 20 as it arrives at the pick-up station is thus properly oriented with respect to the next egg tray 11. After engagement, the eggs and tray are pivoted 180° from pick-up station 12 to conveyor 17 during which transfer, the lifting head assembly is rotated 90° this time in a clockwise direction or from position B to A of FIG. 5. After the eggs are deposited on conveyor 17 (all eggs being deposited in the same orientation), lifting head assembly 20 is returned to pick-up station 12 during which movement no rotation of assembly 20 occurs with the assembly thus being in the position at the beginning of the cycle (A). Such transfer is then repeated until the stacks of trays have been transferred.

By the means described herein, each six-high stack of egg trays positioned at the pick-up station is thus engaged by an independently mounted lifting head 20 which is permitted to move with respect to the common carrier member 30. The illustrated embodiment includes means for accommodating two stacks of eggs although it is noted that additional stacks of eggs may be similarly transferred. Moreover, it is noted that in lieu of or in addition to the floating head assembly, means may be provided in the form of separate platform members 13 which are permitted to move relatively with respect to the lifting head. An apparatus has thus been described which is adapted to transfer egg trays from one station to another while accommodating a different orientation of adjacent trays. The apparatus further allows for complete engagement and lifting of the uppermost tray of adjacently spaced stacks of eggs in which variations in height of the stack are readily accommodated thereby avoiding machine stoppage and egg breaking which might otherwise be encountered.

Although the above description is directed to the preferred embodiment of the invention, it is noted that other variations and modifications will be apparent to those skilled in the art, and may be made without departing from the spirit and scope of the present disclosure.

What is claimed is:

1. An apparatus for transferring egg trays from multiple stacks of trays disposed at a pick-up station to another station which comprises (a) a horizontal carrier means adapted to be moved from the pick-up station to another station including a plurality of apertures therein;
    (b) a rotatably driven member having one end thereof pivotally connected to said horizontal carrier means at the approximate center thereof;
    (c) a platform for supporting each of said multiple stack of egg trays and adapted for upwardly indexing the movement of each tray of eggs into a transfer position;
    (d) a plurality of lifting heads, one for each stack of trays, and including egg and tray engaging means thereof for engaging each individual egg and the tray of eggs in said transfer position;
    (e) a coupling member extending upwardly from each of said lifting heads and disposed in one of said carrier means apertures, said coupling member having the upper portion thereof extending through said carrier means aperture and being of a length sufficient to facilitate vertical movement of said lifting head with respect to said carrier means; and
    (f) a stop member mounted to said upper portion of each coupling member adapted to engage said carrier means so as to limit the downward movement of said lifting head with respect to said carrier means.

2. The apparatus of claim 1 which further includes resilient means disposed on said coupling member between said carrier means and said lifting head so as to downwardly urge said lifting head into engagement with said eggs.

3. The apparatus of claim 2 wherein said resilient means comprises a compression spring disposed on said shaft between said carrier means and said lifting head.

4. The apparatus of claim 1 wherein said coupling member is an elongated shaft and said stop member comprises a collar disposed about the upper portion thereof so as to limit downward movement of said shaft within said carrier means aperture.

5. The apparatus of claim 1 wherein said egg engaging means comprises a vacuum operated cup adapted to engage and hold said egg in position when a vacuum is applied thereto.

6. The apparatus of claim 1 wherein said tray engaging means comprises a latch member disposed at each end of said lifting head adapted to grip and hold the uppermost tray of the respective stack as said carrier means is moved from one position to another.

7. An apparatus for transferring egg trays from adjacently spaced stacks of trays disposed at a pick-up station to another station which comprises (a) a horizontal carrier means adapted to be moved from the pick-up station to another station;
    (b) a plurality of adjacently spaced lifting heads, one for each of said adjacently spaced stacks, mounted to said carrier means and including thereon an engaging means for lifting the eggs in the transfer position;
    (c) at least one platform disposed below said lifting heads for supporting said stack of egg trays and adapted for upwardly indexing the movement of each tray of eggs into a transfer position;
    (d) means for varying the spacing between each of said lifting heads and the respective support platform independent of that of the adjacent head so as to accommodate variations in height between adjacently spaced stacks of trays; and (e) rotatable means coupled to each of said lifting heads adapted to rotate said lifting head approximately 90° during transfer from said pick-up station to another station to accommodate different orientations of alternate trays of eggs in each respective stack of trays; said rotatable means further being adapted to move adjacently spaced lifting heads with respect to one another during transfer from said pick-up station to another station in order to avoid contact of adjacently spaced heads during rotation thereof.

8. The apparatus of claim 7 wherein said carrier means includes a plurality of apertures therein and said varying means comprises (a) a coupling member extending upwardly from each of said lifting heads and disposed in one of said carrier means apertures, said coupling member having the upper portion thereof extending through said carrier means aperture and being of a length sufficient to facilitate vertical movement of said lifting head with respect to said carrier means; and (b) a stop member mounted to said upper portion of each coupling member adapted to engage said carrier means so as to limit the downward movement of said lifting head with respect to said carrier means.

9. The apparatus of claim 8 wherein said coupling member is an elongated shaft and said stop member comprises a collar disposed about the upper portion thereof so as to limit downward movement of said shaft within said carrier means aperture.

10. The apparatus of claim 9 which further includes resilient means disposed on said coupling member between said carrier means and said lifting head so as to downwardly urge said lifting head into engagement with said eggs.

11. An apparatus for transferring egg trays from closely spaced multiple stacks of trays disposed at a pick-up station to another station which comprises (a) a horizontal carrier means adapted to be moved from the pick-up station to another station;

(b) a platform for supporting each of said multiple stack of egg trays and adapted for upwardly indexing the movement of each tray of eggs into a transfer position;

(c) a plurality of lifting heads, one for each stack of trays, including engaging means thereon for lifting the eggs in said transfer position, each of said lifting heads being coupled to said carrier means and adapted to be moved in conjunction therewith from the pick-up station to another station; and (d) rotatable means coupled to each of said lifting heads adapted to rotate said lifting head approximately 90° during transfer from said pick-up station to another station to accommodate different orientations of alternate trays of eggs in each respective stack of trays; said rotatable means further being adapted to move adjacently spaced lifting heads with respect to one another during transfer from said pick-up station to another station in order to avoid contact of adjacently spaced heads during rotation thereof.

12. The apparatus of claim 11 wherein said rotatable means includes a drive means, a rotatably mounted arm coupled to said drive means, and a linkage member having one end thereof pivotally mounted to said arm and the other end thereof pivotally mounted to said lifting head.

13. The apparatus of claim 12 wherein said drive means comprises a rack and pinion drive, said pinion member being mounted to a shaft coupled to a drive member, said shaft having mounted thereon said rotatable arm operatively coupled to each of said adjacently spaced lifting heads.

14. An apparatus for transferring egg trays from closely spaced multiple stacks of trays disposed at a pick-up station to another station which comprises (a) a horizontal carrier means adapted to be moved from the pick-up station to another station;

(b) a platform for supporting each of said multiple stack of egg trays and adapted for upwardly indexing the movement of each tray of eggs into a transfer position;

(c) a plurality of lifting heads, one for each stack of trays, including engaging means thereon for lifting the eggs in said transfer position, each of said lifting heads being coupled to said carrier means and adapted to be moved in conjunction therewith from the pick-up station to another station;

(d) rotatable means coupled to each of said lifting heads adapted to rotate said lifting head approximately 90° during transfer from said pick-up station to another station to accommodate different orientations of alternate trays of eggs in each respective stack of trays; said rotatable means further being adapted to move adjacently spaced lifting heads with respect to one another during transfer from said pick-up station to another station in order to avoid contact of adjacently spaced heads during rotation thereof; and (e) means for varying the spacing between each of said lifting heads and the respective support platform independent of that of an adjacently spaced head so as to accommodate variations in height between adjacently spaced stacks of trays.

15. The apparatus of claim 14 wherein said carrier means includes a plurality of apertures therein and said varying means comprises (a) a coupling member extending upwardly from each of said lifting heads and disposed in one of said carrier means apertures, said coupling member having the upper portion thereof extending through said carrier means aperture and being of a length sufficient to facilitate vertical movement of said lifting head with respect to said carrier means; and (b) a stop member mounted to said upper portion of each coupling member adapted to engage said carrier means so as to limit the downward movement of said lifting head with respect to said carrier means.

16. The apparatus of claim 14 wherein said rotatable means includes a drive means, a rotatably mounted arm coupled to said drive means, and a linkage member having one end thereof pivotally mounted to said arm and the other end thereof pivotally mounted to said lifting head.

* * * * *